United States Patent

Steffens, Jr. et al.

[11] Patent Number: 6,158,768
[45] Date of Patent: Dec. 12, 2000

[54] APPARATUS AND METHOD FOR DISCERNING CERTAIN OCCUPANT CHARACTERISTICS USING A PLURALITY OF CAPACITIVE SENSORS

[75] Inventors: Charles E. Steffens, Jr., Washington; Brian K. Blackburn, Rochester; Joseph E. Mazur, Washington, all of Mich.

[73] Assignee: TRW Vehicle Safety Systems Inc. /TRW Inc., Lyndhurst, Ohio

[21] Appl. No.: 09/027,311

[22] Filed: Feb. 20, 1998

[51] Int. Cl.[7] .................................................. B60R 21/32
[52] U.S. Cl. ............................................ 280/735; 180/237
[58] Field of Search .................................... 280/734, 735; 180/271, 273; 297/250.1; 340/562

[56] References Cited

U.S. PATENT DOCUMENTS

| | | | |
|---|---|---|---|
| 3,740,567 | 6/1973 | Atkins | 340/573 |
| 3,898,472 | 8/1975 | Long . | |
| 4,796,013 | 1/1989 | Yasuda et al. | 340/562 |
| 5,366,241 | 11/1994 | Kithil . | |
| 5,411,289 | 5/1995 | Smith et al. | 280/735 |
| 5,413,378 | 5/1995 | Steffens, Jr. et al. . | |
| 5,439,249 | 8/1995 | Steffens, Jr. et al. . | |
| 5,446,391 | 8/1995 | Aoki et al. | 324/661 |
| 5,525,843 | 6/1996 | Howing . | |
| 5,531,472 | 7/1996 | Semchena et al. | 280/735 |
| 5,602,734 | 2/1997 | Kithil . | |
| 5,618,056 | 4/1997 | Schoos et al. | 280/735 |
| 5,626,359 | 5/1997 | Steffens, Jr. et al. . | |
| 5,722,686 | 3/1998 | Blackburn et al. | 280/735 |
| 5,868,423 | 2/1999 | Takimoto et al. | 280/735 |
| 5,871,232 | 2/1999 | White | 280/735 |
| 6,043,743 | 3/2000 | Saito et al. | 340/562 |

OTHER PUBLICATIONS

U.S. application No. 08/442,190 to Blackburn et al. filed May 16, 1995 for Method and Apparatus for Sensing an Occupant Position Using Capacitive Sensing (not enclosed).

An article entitled "Electronic Components and Circuits", NASA Tech Briefs, Aug. 1992.

An article from Automotive Engineering dated May 1997, p. 75.

*Primary Examiner*—Brian L. Johnson
*Assistant Examiner*—Faye M. Fleming
*Attorney, Agent, or Firm*—Tarolli, Sundheim, Covell, Tummino & Szabo L.L.P.

[57] ABSTRACT

An apparatus (47) determines presence, type, and a size value of a vehicle occupant (14) located within a vehicle (12). A first capacitive sensor (46A) is located on a first side of an occupant location within the vehicle (12) and senses a first capacitance value. An associated drive/monitor circuit (42A) provides a first signal (44A) indicative of the first capacitance value. A controller (27) determines from the first signal (44A) whether the first capacitance value is indicative of an occupant located proximate to the first capacitive sensor (46A). The controller (27) determines a first distance between the first capacitive sensor (46A) and the occupant (14) using the first signal (44A). A second capacitive sensor (46C) is located on a second side of the occupant location and senses a second capacitance value. An associated drive/monitor circuit (42C) provides a second signal (44C) indicative of the second capacitance value. The controller (27) determines from the second signal (44C) whether the second capacitance value is indicative of an occupant located proximate to the second capacitive sensor (46C). The controller (27) determines a second distance between the second capacitive sensor (46C) and the occupant using the second signal (44C). The controller (27) determines from at least one of the first and second signals (44A and 44C) whether the occupant type is a child in a child seat. The controller (27) determines a size value of the occupant using the first and second determined distances.

28 Claims, 5 Drawing Sheets

APPARATUS AND METHOD FOR DISCERNING CERTAIN OCCUPANT CHARACTERISTICS USING A PLURALITY OF CAPACITIVE SENSORS

FIELD OF THE INVENTION

The present invention is directed to occupant sensing for use within a vehicle occupant restraint system and is particularly directed to an apparatus and a method for determining certain occupant characteristics for the purpose of controlling an inflatable restraint module of the restraint system.

BACKGROUND OF THE INVENTION

Vehicle occupant restraint systems having an actuatable restraint are well known in the art. One particular type of actuatable restraint system includes an inflatable restraint module. An inflatable restraint of the module is commonly referred to as an air bag, and is mounted to inflate within the occupant compartment of the vehicle. The restraint module has a source of inflation fluid and an electrically actuatable igniter, referred to as a squib.

The occupant restraint system further includes a collision/crash sensor for sensing the occurrence of a vehicle crash condition and for providing an electrical signal indicative of the crash condition. When the sensor indicates that the vehicle is in a crash condition requiring inflation of the air bag to help protect a vehicle occupant ("a deployment crash condition"), an electric current of sufficient magnitude and duration is passed through the squib for the purpose of igniting the squib. The squib, when ignited, activates the source of inflation fluid (e.g., ignition of a combustible gas or heat generating composition and/or opening of a container of pressurized gas). The source of inflation fluid is operatively coupled to the air bag, and, when activated, inflates the air bag.

Several known occupant restraint systems include an occupant position sensor and a controller, which controls the associated restraint module in response to a sensed position of a vehicle occupant. The occupant position sensor for such a system is an ultrasonic sensor, an infrared sensor, or a seating sensor. In response to the sensed occupant position, the timing of air bag deployment, the pressure of the inflated air bag, aiming of the air bag, and/or disabling the air bag are controlled. These adjustable aspects, collectively, adjust the dynamic profile of the air bag. A restraint system with adjustable aspects is commonly referred to as a "smart" restraint system.

One example of a system with an adjustable dynamic profile is disclosed in U.S. Pat. No. 5,232,243 to Blackburn et al. and assigned to the assignee of the present application. This patent discloses that it is not always desirable to inflate an air bag with 100% of the inflation fluid (e.g., gas) provided from an inflation fluid source. The system disclosed by Blackburn et al. controls the amount of gas that inflates the air bag in response to the detected weight of the occupant. Another system disclosed in U.S. Pat. No. 5,330,226 to Gentry et al., and assigned to the assignee of the present application, controls the amount of gas that inflates an air bag in response to detected occupant position.

SUMMARY OF THE INVENTION

The present invention provides an apparatus for determining at least one of presence, type, and size value of a vehicle occupant located within a vehicle. First capacitive sensor means, located on an instrument panel of the vehicle that is on a first side of an occupant seating location within the vehicle, senses a first capacitance value and provides a first signal indicative of the first value. A means determines from the first signal whether the first capacitance value is indicative of an occupant located proximate to the first capacitive sensor means. A means determines a first distance between the first sensor means and the proximately located occupant using the first signal. Second capacitive sensor means, located on a second side of the occupant seating location, senses a second capacitance value and provides a second signal indicative of the second value. A means determines from the second signal whether the second capacitance value is indicative of the occupant located proximate to the second capacitive sensor means. A means determines a second distance between the second sensor means and the proximately located occupant using the second signal.

In accordance with another aspect, the present invention provides an apparatus for determining an empty vehicle seat. First capacitive sensor means, located on a first side of an occupant seating position, senses a first capacitance value and provides a first signal indicative of the first capacitance value. A means determines whether the seat is empty using the first signal. Second capacitive sensor means, located on a second side of the occupant seating position, senses a second capacitance value and provides a second signal indicative of the second capacitance value. A means determines whether the seat is empty using the second signal.

In accordance with another aspect, the present invention provides an apparatus for determining occupant characteristics of a vehicle occupant. First capacitive sensor means, located on a first side of an occupant seating location, senses a first capacitance value resulting from the occupant and provides a first signal indicative of the first value. Means determines a first distance between the first sensor means and the occupant using the first signal. Second capacitive sensor means, located on a second side of the occupant seating location, senses a second capacitance value resulting from the occupant and provides a second signal indicative of the second value. Means determines a second distance between the second sensor means and the occupant using the second signal. Means determines characteristic values of the occupant using the first and second determined distances. The characteristic values include type, size, and weight of the occupant.

In accordance with another aspect, the present invention provides an apparatus for determining an occupant type of a vehicle occupant. First capacitive sensor means, located on a first side of an occupant seating position, senses a first capacitance value in a space adjacent to the first sensor means and provides a first signal indicative of the first capacitance value. Second capacitive sensor means, located on a second side of the occupant seating position, senses a second capacitance value in a space adjacent to the second sensor means and provides a second signal indicative of the second capacitance value. Means determines whether the occupant is a child in a child seat using the first and second signals.

In accordance with yet another aspect of the present invention, a method is provided for determining at least one of presence, type, and size value of a vehicle occupant located within a vehicle. A first capacitance value is sensed by a first capacitive sensor means located on a first side of an occupant seating location within the vehicle. A first signal is provided, which is indicative of the first capacitance value. A determination is made from the first signal whether the first capacitance value is indicative of an occupant located proximate to the first capacitive sensor. A first distance between the first sensor means and the proximately located occupant is determined using the first signal. A second capacitance value is sensed by a second capacitive sensor means located on a second side of the occupant seating location. A second signal is provided, which is indicative of the second capacitance value. A determination is made from the second signal whether the second capacitance value is indicative of the occupant located proximate to the second capacitive sensor. A second distance between the second sensor means and the proximately located occupant is determined using the second signal. A determination is made whether the occupant type is a child in a child restraint seat. The determination regarding occupant type is made from at least one of the first and second signals based on at least one of the first and second capacitance values of the first and second signals. A size value of the occupant is determined using the first and second determined distances.

In accordance with yet another aspect of the present invention, a method is provided for determining occupant characteristics of a vehicle occupant. A first capacitance value, resulting from the occupant, is sensed with a first capacitive sensor means located on a first side of an occupant seating location. A first signal is provided, which is indicative of the first capacitance value. A first distance between the first sensor means and the occupant is determined, using the first signal. A second capacitance value, resulting from the occupant, is sensed with a second capacitive sensor means located on a second side of the occupant seating location. A second signal is provided, which is indicative of the second capacitance value. A second distance between the second sensor means and the occupant is determined, using the second signal. Characteristic values of the occupant are determined using the first and second determined distances. The characteristic values including type, size, and weight of the occupant.

In accordance with still another aspect of the present invention, a method is provided for determining an occupant type of a vehicle occupant. A first capacitance value is sensed by a first sensor means, for a space adjacent to the first sensor means and located on a first side of an occupant seating location. A first signal is provided, which indicative of the first capacitance value. A second capacitance value is sensed by a second sensor means, for a space adjacent to the second sensor means and located on a second side of the occupant seating location. A second signal is provided, which is indicative of the second capacitance value. A determination is made whether the occupant is a child in a child seat. The determination is made using the first and second signals.

BRIEF DESCRIPTION OF THE DRAWINGS

Other features and advantages of the present invention will become apparent to those skilled in the art to which the present invention relates from a reading of the following detailed description of a preferred embodiment with reference to the accompanying drawings, in which.

DESCRIPTION OF A PREFERRED EMBODIMENT

Figure 1:
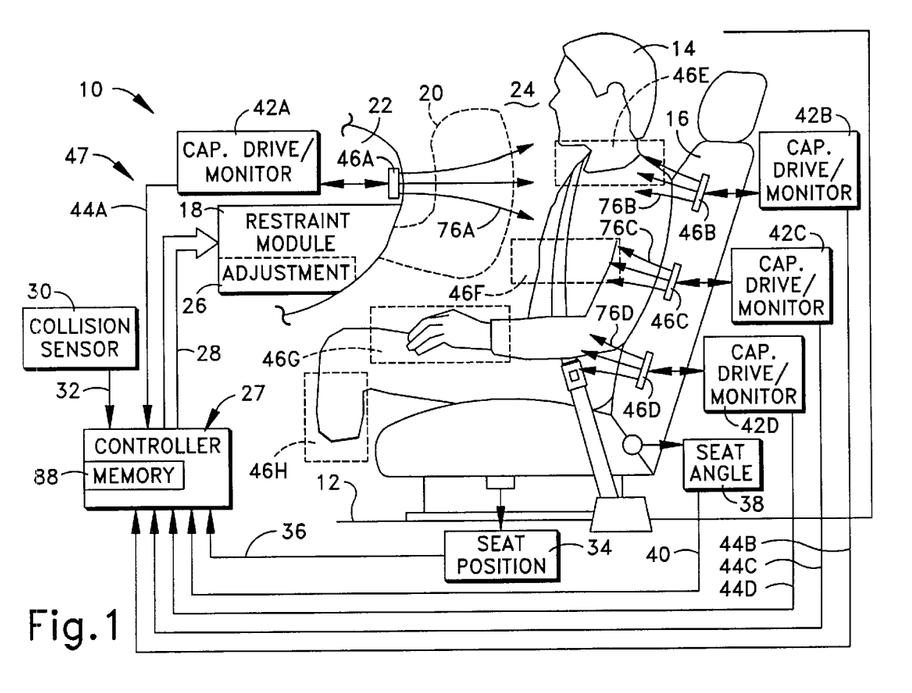
FIG. 1 is a schematic illustration of an apparatus in accordance with the present invention, within a vehicle containing an occupant.

An occupant restraint system 10 is schematically shown within a vehicle 12 in FIG. 1. The restraint system 10 is provided for a vehicle occupant 14, who is a front-seat passenger and who is seated on a vehicle seat 16 within the vehicle 12. Within the system 10 is an actuatable occupant restraint module 18, which includes an inflatable restraint 20. The inflatable restraint 20 is commonly referred to as an air bag.

Prior to inflation deployment, the air bag 20 is folded and stored within the instrument panel 22, as is known in the art. A source of inflation fluid, such as an inert gas, is operatively connected to the air bag 20. Inflation fluid from the source, which may be generated by combustion of pyrotechnic material and/or released from a pressurized container, fills the air bag 20 to an inflated condition within an occupant compartment 24 of the vehicle 12. Once inflated, as occurs during a vehicle collision, the air bag 20 helps to restrain the occupant 14.

The restraint module 18 is of the type referred to in the art as a "smart restraint", in that the restraint module has at least one adjustable aspect 26. For example, the adjustable aspect may be deployment of the air bag 20. Examples of air bag deployment adjustment include adjustment of inflation timing, adjustment of inflation pressure, adjustment of location of the inflated air bag 20 relative to the occupant 14, and suppressing deployment of the air bag. A specific example of adjustment to inflation timing is control of the time of initiation of air bag inflation using a selected determination algorithm.

A specific example of adjustment of inflation pressure is control of an inflation fluid source to provide a controlled or pre-selected amount of inflation fluid to the air bag 20, e.g., a restraint system having a plurality of separately controllable inflation fluid sources. Another specific example of adjustment of inflation pressure is control of a pressure relief valve, which vents inflation fluid away from the air bag 20. A specific example of adjustment of air bag positioning is control of positioning motors operative to pivot the air bag module left or right within the instrument panel 22. Another specific example of adjustment of air bag positioning is moving the entire restraint module toward or away from the occupant. Dynamic profile control is accomplished by controllably directing inflation fluid into the air bag in predetermined zones within the air bag or by controlling the number and timing of operation of a plurality of inflation fluid sources and vent valves.

Control of the restraint module 18, to adjust the adjustable aspect(s) 26 and to cause actuation of the restraint module, is by a controller 27. Controller 27 provides control signals 28 to the restraint module 18. In one example, the controller 27 is a microcomputer. The controller 27 receives sensory input from several sources and, using the sensory input, makes determinations regarding restraint module control (e.g., the controller operates a crash algorithm).

One of the sensory input sources for the controller 27 is a sensor 30 that senses a vehicle condition for which the occupant 14 is to be restrained. The sensor 30 provides a signal 32 to the controller 27 indicative of the sensed vehicle condition. In one example, which is illustrated in the Figures, the sensor 30 is a collision/crash sensor and senses a condition that is indicative of a vehicle collision. Preferably, the collision sensor 30 is an accelerometer, and the signal 32 is an electrical signal having a characteristic (e.g., voltage, frequency, etc.) indicative of the sensed crash deceleration. In another example, the sensor 30 senses a condition indicative of a vehicle rollover. It should be appreciated by a person of ordinary skill in the art that the restraint system 10 could have a plurality of sensors 30 providing signals 32 to the controller 27 which are indicative of a variety of vehicle conditions for which the occupant 14 is to be restrained. Hereinafter, for the purpose of clarity, only the single collision sensor 30 and its collision indicative signal 32 are discussed.

The controller 27 analyzes the output signal 32 from the collision sensor 30 and determines if a deployment crash condition is occurring. A deployment crash condition is one in which deployment of the air bag is desired to enhance the restraining function of the restraining system 10 for the occupant 14. It is contemplated that any of several known crash algorithms can be used for the determination of a deployment crash event. Examples of such algorithms are known in the art and are not discussed herein for brevity.

Other sensory inputs for the controller 27 can be provided by a seat position sensor 34, via a signal 36, and by a seat-back angle sensor 38, via a signal 40. The signal 36 from the seat position sensor 34 is indicative of the location of the seat 16 relative to the body of the vehicle 12 and, thus, indicative of the location of the seat relative to the portions of the vehicle which are fixed relative to the body. The signal 36 is also, therefore, indicative of the distance between the seat and the instrument panel 22.

The signal 40 from the seat-back angle sensor 38 is indicative of the amount of seat-back inclination (i.e., the angle of recline of the seat back). The information contained within the signal 40 is useful to determine the distance between the seat back of the seat 16 and the instrument panel 22. The controller 27 may use the information from the signals 36 and 40 to determine distances between the restraint module 18 and the seat back of the seat 16.

Sensory input to the controller 27 is also provided by a plurality capacitive sensor drive/monitor circuits 42A–42D, via signals 44A–44D. Each drive/monitor circuit 42A–42D is associated with a capacitive sensor 46A–46D, respectively. The signals 44A–44D are used by the controller 27 to discern occupant information for use within the restraint system 10, in accordance with the present invention. Thus, the capacitive sensors 46A–46D, the drive/monitor circuits 42A–42D, and the controller 27 form an apparatus 47 for discerning occupant characteristics. Preferably, and as shown in the disclosed embodiment, the apparatus 47 is part of the restraint system 10.

Within the apparatus 47, each capacitive sensor 46A–46D has the function of sensing the presence of an occupant, and the corollary function of sensing a distance between the respective capacitive sensor and the occupant for use in determining the type of occupant and certain occupant characteristics. The capacitive sensors 46A–46D are located in a "surrounding" array around or about the occupant location that is to be monitored. Surrounding the occupant location provides information regarding the occupant 14 for determining an occupant characterization.

The embodiment of the present invention shown in the Figures has four (4) capacitive sensors 46A–46D. A first capacitive sensor 46A is located in the instrument panel 22, and second through fourth capacitive sensors 46B–46D are located in a vertical array in the seat back of the seat 16. A different number of capacitive sensors may be used, however, and the capacitive sensors may be located at other locations "surrounding" the occupant location. For example, capacitive sensors may be located in a seat bottom, an armrest, a roof headliner, a door, and, if the system is for a vehicle driver, in a steering wheel. Examples of such other capacitive sensors (i.e., 46E–46H) are shown in phantom in FIGS. 1 and 3–5 as being located on a passenger-side door of the vehicle 12 (i.e., on the far side of the occupant as viewed in the Figures). The structure and operation of the other capacitive sensors 46E–46H are similar to the structure and operation of the capacitive sensors 46A–46D, and the discussion is thus omitted for brevity.

Each of the capacitive sensors 46A–46D has similar structure, and only the structure of the first capacitive sensor 46A is set forth herein, for the purpose of brevity. Also, each of the drive/monitor circuits 42A–42D has similar structure and function, and only the drive/monitor circuit 42A for the first capacitive sensor 46A is set forth herein, for brevity.

Figure 2:
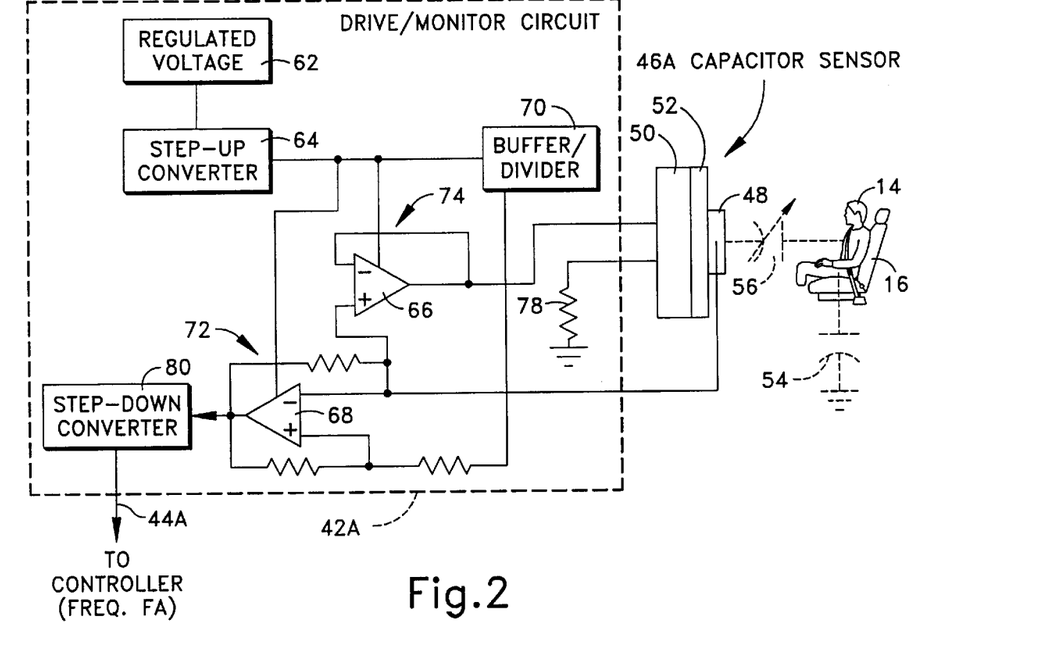
FIG. 2 is a schematic circuit diagram of one of the drive/monitor circuits shown in FIG. 1.
Figure 3:
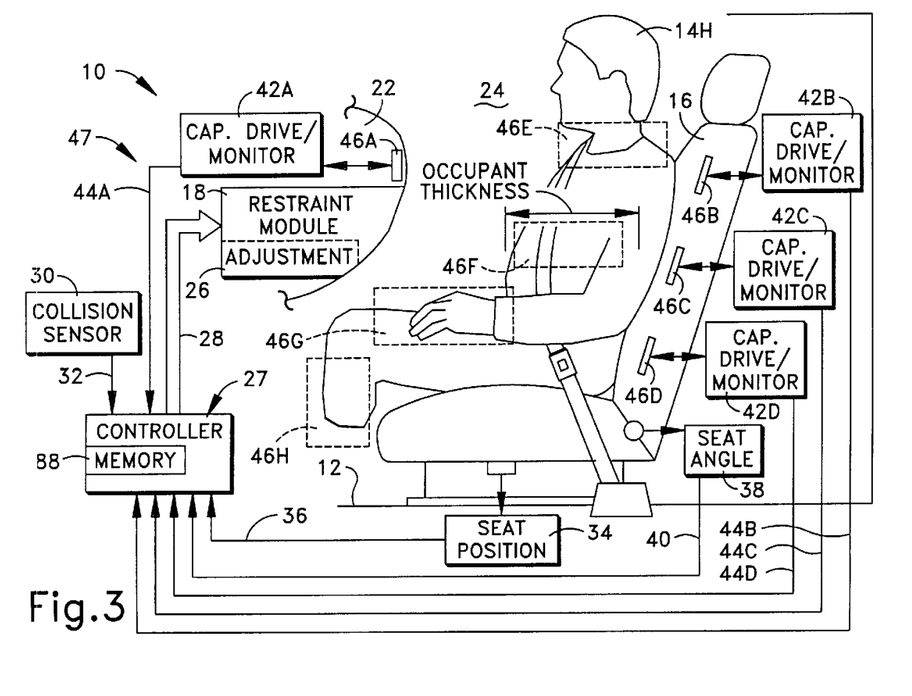
FIG. 3 is similar to FIG. 1, and shows an occupant having a weight different than the occupant of FIG. 1.
Figure 4:
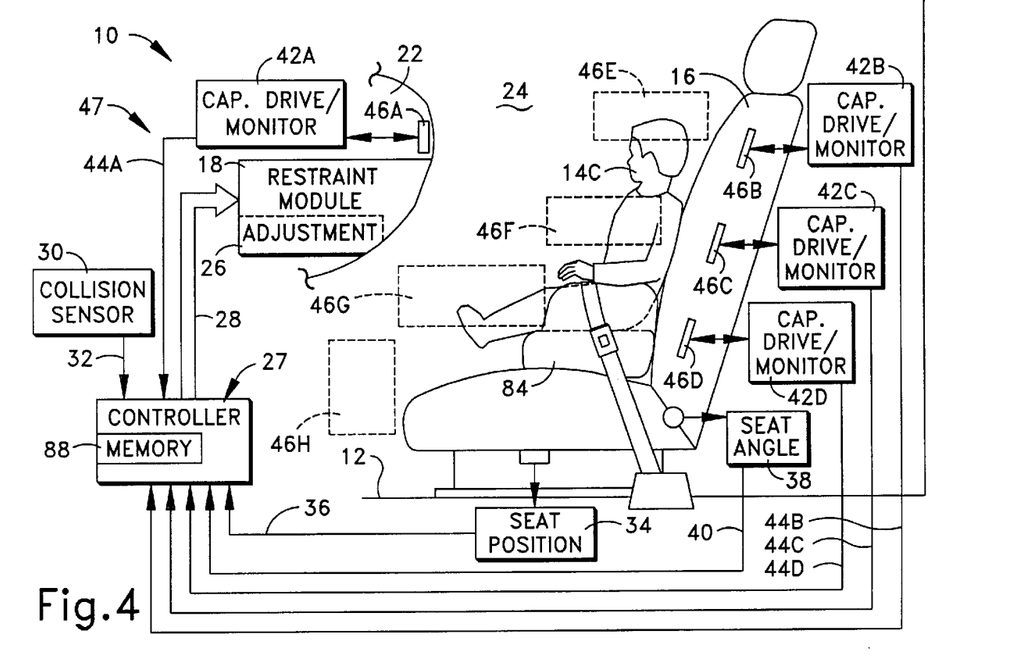
FIGS. 4 and 5 are similar to FIG. 1, and show occupants of different occupant types than the occupant of FIG. 1.
Figure 5:
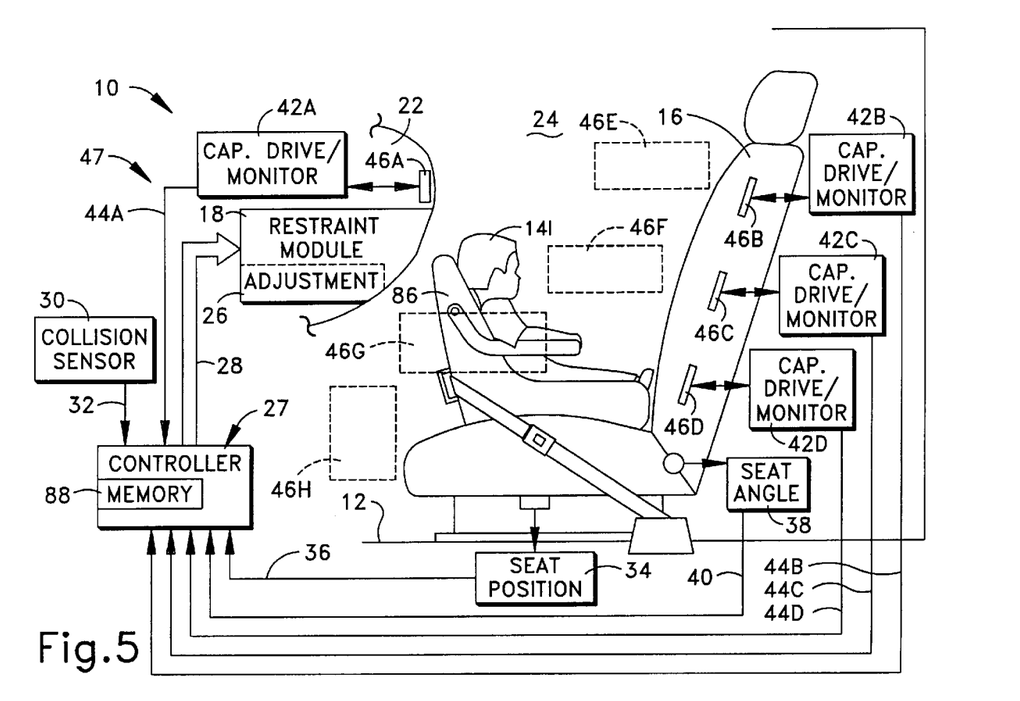

FIG. 2 shows an example of the first capacitive sensor 46A and its associated drive/monitor circuit 42A. Within the first capacitive sensor 46A, a capacitor plate 48, also referred to as a capacitance sensing electrode, is mounted to a conductive shield 50 with an insulating layer 52 sandwiched between the capacitor plate and the shield. Although member 48 is referred to as a plate or an electrode, and the member 50 is referred to as a shield, they are both preferably made of conductive materials deposited on the insulating layer 52 using flexible circuit printing technology.

Sufficient electrical communication exists between the occupant 14 and the body of the vehicle 12 that the occupant 14 is capacitively coupled to vehicle electrical ground. The capacitive coupling of the occupant 14 is schematically shown in FIG. 2 as an effective capacitor 54. The capacitance value of the effective capacitor 54 is a relatively fixed value. A sufficient electrical communication also exists between the occupant 14 and the capacitance-sensing electrode 48 that the occupant and the electrode 48 form a variable effective capacitor 56. The capacitance value of the variable effective capacitor 56 is functionally related to the distance between the occupant 14 and the capacitance-sensing electrode 48. If an occupant is not present, or an occupant is present but not within the sensory bounds of the capacitive sensor, only a relatively low, ambient capacitance value occurs.

The associated drive/monitor circuit 42A is operatively connected to the conductive shield 50 and the capacitance-sensing electrode 48. The drive/monitor circuit 42A measures the value of the variable effective capacitor 56, which is, in turn, indicative of the distance between the occupant 14 and the electrode 48. The drive/monitor circuit 42A outputs the signal 44A to the controller 27. The signal 44A has a value indicative of the monitored capacitance value of the effective capacitor 56.

Drive/monitor circuit 42A includes a regulated voltage source 62 operatively connected to the vehicle battery (not shown). The output of the voltage source 62 is connected to a step-up converter 64. An increased voltage level is needed to increase the ability of the first capacitive sensor 46A to sense an occupant at a relatively large distance from the first capacitive sensor 46A (e.g., a distance farther than one inch away). The output of the step-up converter 64 is used to power two operational amplifiers 66 and 68 of the drive/monitor circuit 42A. The output of the step-up converter 64 is also connected to a buffer/divider circuit 70. The buffer/ divider circuit 70 is a voltage dividing resistor network that is buffered with a voltage follower. The buffer/divider circuit 70 is used in the drive/monitor circuit 42A to permit a resistor-capacitor ("RC") oscillator circuit 72 to have an output signal with a symmetrical swing about a zero output.

The capacitance-sensing electrode 48 and shield 50 are electrically driven within the RC oscillator circuit 72. The variable effective capacitor 56 (i.e., between the capacitance-sensing electrode 48 and occupant 14) functions as the capacitor in the RC oscillator circuit 72. The components of the RC oscillator circuit 72 are selected to provide an oscillation preferably in the range of 20–100 kHz. The shield 50 is driven at the same voltage as the capacitance-sensing electrode 48 through a voltage follower circuit 74 so as to prevent any electrical potential between the shield 50 and electrode 48. The purpose of the shield 50 is to focus the electric field 76A (FIG. 1) of the capacitance-sensing electrode 48, thereby permitting occupant sensing at a greater distance.

The shield 50 (FIG. 2) is connected to vehicle ground through a high impedance resistor 78, e.g., 1–22 Mohms. This high impedance connection allows for charge bleed-off from the shield 50. Bleeding-off the charge on the shield 50 ensures that the capacitance value and the RC circuit set point (i.e., the center frequency of the oscillator) do not change.

The output of the RC oscillator circuit 72 is connected to a step-down converter 80. The output of the step-down converter 80 is the signal 44A, and is an oscillating signal having a frequency indicative of: (1) the presence of the occupant 14 and (2) the distance between the occupant 14 and the capacitance-sensing electrode 48, and thus the instrument panel 22. The converter 80 brings the voltage levels down to a range that can be safely processed by the controller 27.

An output frequency of signal 44A above a predetermined threshold frequency is indicative of the absence of an occupant. An output frequency of signal 44A below the predetermined threshold frequency ("occupant present threshold") is indicative of the presence of an occupant. The output frequency decreases as the distance between the occupant 14 and the electrode 48 decreases and is, thus, indicative of distance between the first capacitive sensor 46A and the occupant. The other drive/monitor circuits 42B–42D provide similar information, via the respective signals 44B–44D, regarding the detected absence/presence of the occupant 14, and the distances between the respective capacitive sensors 46B–46D and the occupant. The frequency thresholds (the occupant present thresholds) associated with the first through fourth signals 44A–44D are selected, in part, based upon the size of the area monitored by the respective sensor. The frequency thresholds may be different for different signals 44A–44D. Also, the signals may be pulsed at different frequencies at different times.

The information contained within the signals 44A–44D from the drive/monitor circuits 42A–42D (indicative of absence/presence of the occupant 14 and distance) is processed within the controller 27 to make a determination regarding presence of an occupant and to determine certain characteristics of the occupant. Specifically, the characteristics which are determined by controller 27 are the type of occupant, the position of the occupant, the torso depth or thickness of the occupant (for use in determining the girth and weight of the occupant), and the absence of an occupant (i.e., the seat is empty).

The presence of an occupant is indicated by at least one of the signals 44A–44D having its frequency below its respective threshold value. For an adult occupant 14 (e.g., an average build adult, FIG. 1, or a heavy-set adult 14H, FIG. 3), each of the signals 44A–44D has a frequency value below its respective occupant present threshold. For a forward-facing child occupant 14C (FIG. 4, e.g., secured in a child booster seat 84 on the vehicle seat 16), the signals 44A, 44C and 44D each would have a frequency value below their respective occupant present threshold. In each of these situations, the controller 27 determines that the occupant type is a passenger, seated in a forward facing direction. Further, for the situation shown in FIG. 4, the controller 27 determines that the occupant type is a child because the frequency of the signal 44B is above the associated frequency threshold. For an infant occupant 14I (FIG. 5) in a rearward facing infant seat (RFIS) 86, only the fourth capacitive sensor 46D outputs a signal below its associated occupant present threshold. The controller 27 determines that the occupant type is an infant in a RFIS because only the frequency of the signal 44D is below the associated frequency threshold. If the controller 27 determines that the occupant is an infant in a RFIS, the restraint module 18 may be disabled.

The controller 27 "knows" (e.g., pre-stored vehicle-specific data stored in a memory 88 of the controller) the position of the first capacitive sensor 46A relative to the restraint module 18. It can calculate the position of the second through fourth capacitive sensors 46B–46D (i.e., via the input from the seat position sensor 34 and the seat-back angle sensor 38) relative to the restraint module 18. The controller is thus able to determine the position of the occupant 14 relative to the restraint module using simple mathematics. In other words, the controller 27 analyzes the disturbance in the ambient electrical field (i.e., no occupant present), as represented by the distance-indicative frequencies of the signals, to create an occupant position characterization. Specifically, the distance to the occupant from each of the sensors is used to demarcate the outer boundaries of the occupant. It should be noted that a less accurate method could be employed by not using the seat position sensors.

The controller 27 estimates the weight of the occupant 14 by calculating a torso dimension of the occupant (e.g., "mapping" the outer surface of the torso). For example, in the illustrated embodiment, the depth or thickness (see FIG. 3) of the torso is determined by: (1) determining the overall distance between the first capacitive sensor 46A and one of the second through fourth capacitive sensors in the seat back (e.g., the third capacitive sensor 46C) in the seat-back; (2) determining the distance from the first capacitive sensor 46A to the front of the torso of the occupant 14 (i.e., the front spacing distance); (3) determining the distance from the one seat-back sensor 46C (i.e., the third sensor) to the rear of the torso of the occupant 14 (i.e., the rear spacing distance); and (4) subtracting both the front and rear spacing distances from the overall distance. The overall distance is determined via the controller 27 "knowing" (pre-stored in the memory 88) the location of the first capacitive sensor 46A, and calculating the position of the one of the second through fourth capacitive sensors 46B–46D from the input from the seat position sensor 34 and the seat-back angle sensor 38.

The torso thickness is proportional to torso girth. The memory 88 of the controller 27 has a thickness/girth-to-weight look-up table. A weight estimate of the occupant 14 is found by looking-up the calculated torso thickness value.

The controller 27 controls the adjustable aspect(s) 26 of the restraint module 18 in response to the determined occupant characteristics. An example of the adjustable aspect of the restraint module 18 is the adjustment of the air bag inflation pressure based upon occupant position and weight. It is assumed that the controller 27 has determined that an adult occupant is on the seat and not a forward-facing child occupant or an infant in a RFIS. To control bag pressure, the memory 88 of the controller 27 uses an internal look-up table (i.e., a memory, represented as table 90, FIG. 6). The look-up table 90 is divided into a plurality of occupant position ranges 92 and a plurality of occupant weight ranges 94.

Figure 6:
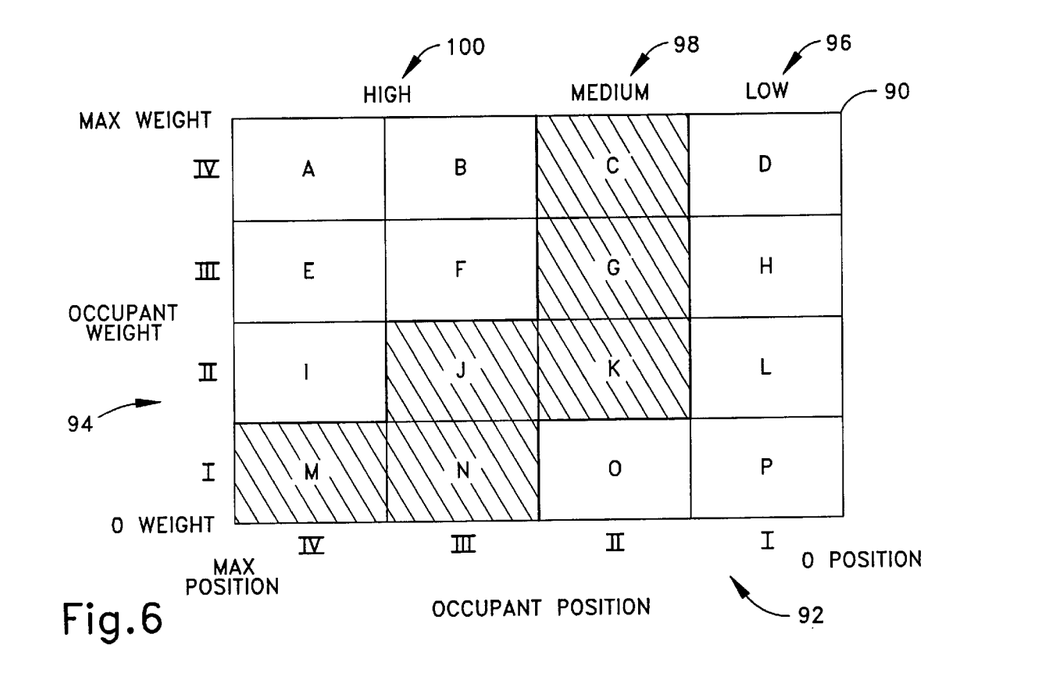
FIG. 6 is a schematic depiction of a control matrix utilized within a controller of FIG. 1.

With regard to the occupant position ranges 92, for the purposes of discussion, the distance between the restraint module 18 and the seat 16 when it is in its rearward-most location, i.e., the maximum anticipated distance, is divided into four ranges. If the occupant 14 is in a first range between a zero distance, i.e., immediately adjacent to the restraint module 18, and about 10% of the maximum distance, the occupant is said to be in a first position range designated I. When the occupant 14 is in a position greater than about 10% and not more than about 30% of the maximum anticipated distance from the restraint module 18, the occupant is in position range II. When the occupant 14 is in a position greater than about 30% and not more than about 60% of the maximum anticipated distance from the restraint module 18, the occupant is in position range III. When the occupant 14 is in a position greater than about 60% of the maximum anticipated distance from the restraint module 18, the occupant is in occupant position range IV.

Occupant weight is divided, for the purposes of this example, into four weight ranges between zero weight and a maximum predetermined weight. When an occupant's weight is between 0 and about 25% of the maximum predetermined weight value, the occupant is said to be in occupant weight range I. When the occupant's weight is greater than about 25% and not more than about 50% of the maximum predetermined weight, the occupant's weight is said to be in occupant weight range II. When the occupant's weight is greater than about 50% and not more than about 75% of the maximum predetermined weight, the occupant's weight is said to be in occupant weight range III. When the occupant's weight is greater than about 75% of the maximum predetermined weight, the occupant's weight is said to be in maximum occupant weight range IV. An occupant weighing more than the maximum predetermined weight will be characterized as being in the maximum weight range IV.

The four occupant weight ranges and the four position ranges form a 4×4 matrix that provides sixteen (16) occupant characterization blocks labeled A–P. These occupant characterization blocks are grouped into three control zones. Blocks D, H, L, P, and O are designated as a low pressure control zone 96. Blocks C, G, J, K, M, and N are designated as a medium pressure control zone 98. Blocks A, B, E, F and I are designated as a high-pressure control zone 100. The controller 27, to control the adjustable aspect(s) 26, associates the determined occupant characteristics with one of the control zones 96, 98, and 100. It should be noted that other control zones could be used. These other zones could include a zone in which air bag deployment is suppressed.

The control zones 96, 98, and 100 are based, at least in part, upon the amount of pressure needed in the air bag 20 to restrain the occupant 14. The occupant's position and weight is preferably continuously determined by the controller 27 to enable the associated adjustment. The actual control of the pressure to achieve the low, medium, and high pressure (or even no pressure—i.e., deployment suppression) in the air bag can be accomplished using vent valves or multiple inflators. Vent valves and multiple inflators are known in the art and are not discussed herein for brevity.

The matrix of FIG. 6 considers both weight and distance and establishes three separate air bag pressures. The matrix approach permits simplicity in data manipulation. When an occupant's weight and position places the occupant in the low control zone 96, a predetermined minimum inflation pressure is employed in the air bag 20 upon deployment. When an occupant's weight and position places him in the medium control zone 98, a predetermined median inflation pressure is employed in the air bag 20 upon deployment. If an occupant's weight and position places him in the high control zone 100, a predetermined maximum inflation pressure is employed in the air bag 20 upon deployment.

Figure 7:
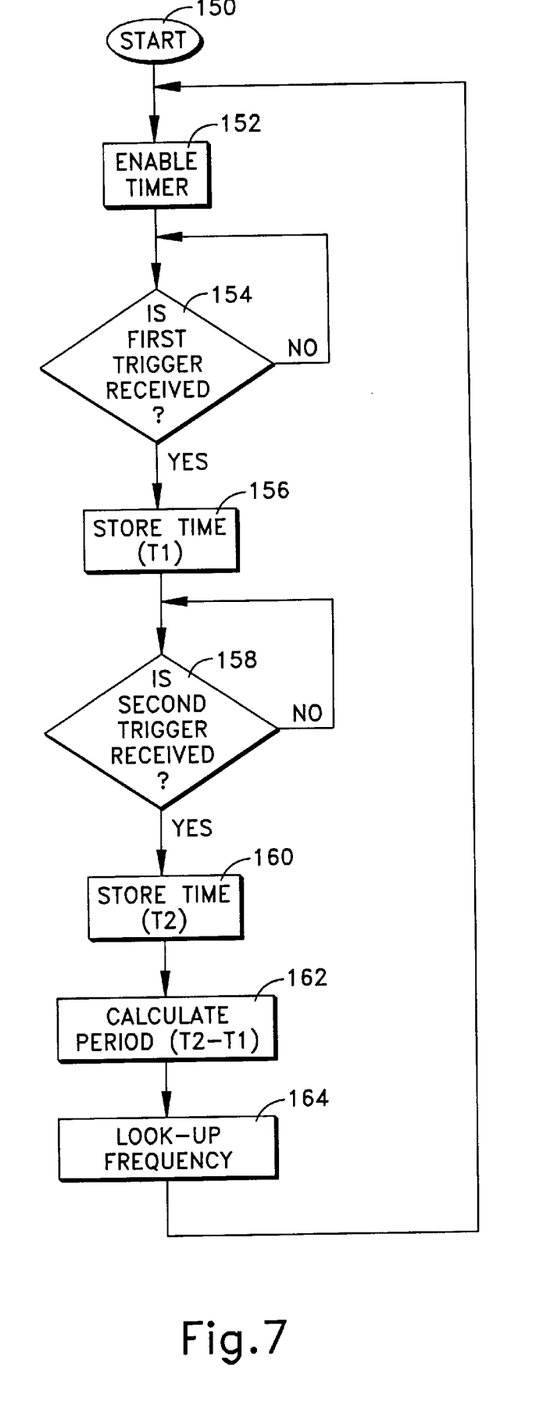
FIGS. 7 and 8 are flow charts for processes preformed within the controller shown in FIG. 1.

As noted above, the frequencies of the signals 44A–44D are indicative of respective distances between the associated sensor and the occupant. Accordingly, the controller 27, via processing of the signals 44A–44D, determines these distances. A flow chart of an example process for frequency determination, performed within the controller 27, is illustrated in FIG. 7. The process of FIG. 7 is described for the first capacitive sensor 46A and drive/monitor circuit 42A (i.e., for the front spacing distance). The controller 27 performs the same frequency-determining process for each of the capacitive sensors 46A–46D.

The process is initiated at step 150, wherein initial operational states are set. At step 152, a timer is enabled. At step 154, it is determined whether a first trigger is received. The first trigger is the occurrence of a designated output value in the output signal 44A (e.g., the occurrence of a zero crossing event in the signal 44A). If the determination at step 154 is negative, the process loops back and repeats step 154, i.e., the process awaits the occurrence of a first trigger. If the determination at step 154 is affirmative, a process proceeds to step 156.

At step 156, the time (T1) of the first trigger reception is taken from an internal clock source of the controller 27 and stored. The process proceeds to step 158 wherein it is determined whether a second trigger is received. The second trigger is a predetermined output in the signal 44A (e.g., another zero crossing occurrence). If the determination at step 158 is negative, the process loops back and repeats step 158, i.e., the process awaits the occurrence of a second trigger. If the determination at step 158 is affirmative, the process proceeds to step 160, wherein the time (T2) of receipt of the second trigger is stored.

If two zero crossings occur in signal 44A, it is assumed that the signal 44A is oscillating at some frequency. The process needs to determine the frequency. At step 162, the period of the oscillating output signal is calculated by subtracting the first stored time from the second stored time. At step 164, the calculated period is used to determine the frequency (FA for the first capacitive sensor 46A), which is the inverse of the period. The frequency value is derived from a look-up table or can be calculated. After step 164, the process loops back to step 152. The frequency look-up tables, associated with the four capacitive sensors 46A–46D, are in the memory 88 of the controller 27. Further, once the four current frequencies are obtained from the look-up table, the frequencies are stored in temporary locations in the memory 88 for use in the restraint control/adjustment processing performed by the controller 27.

Figure 8:
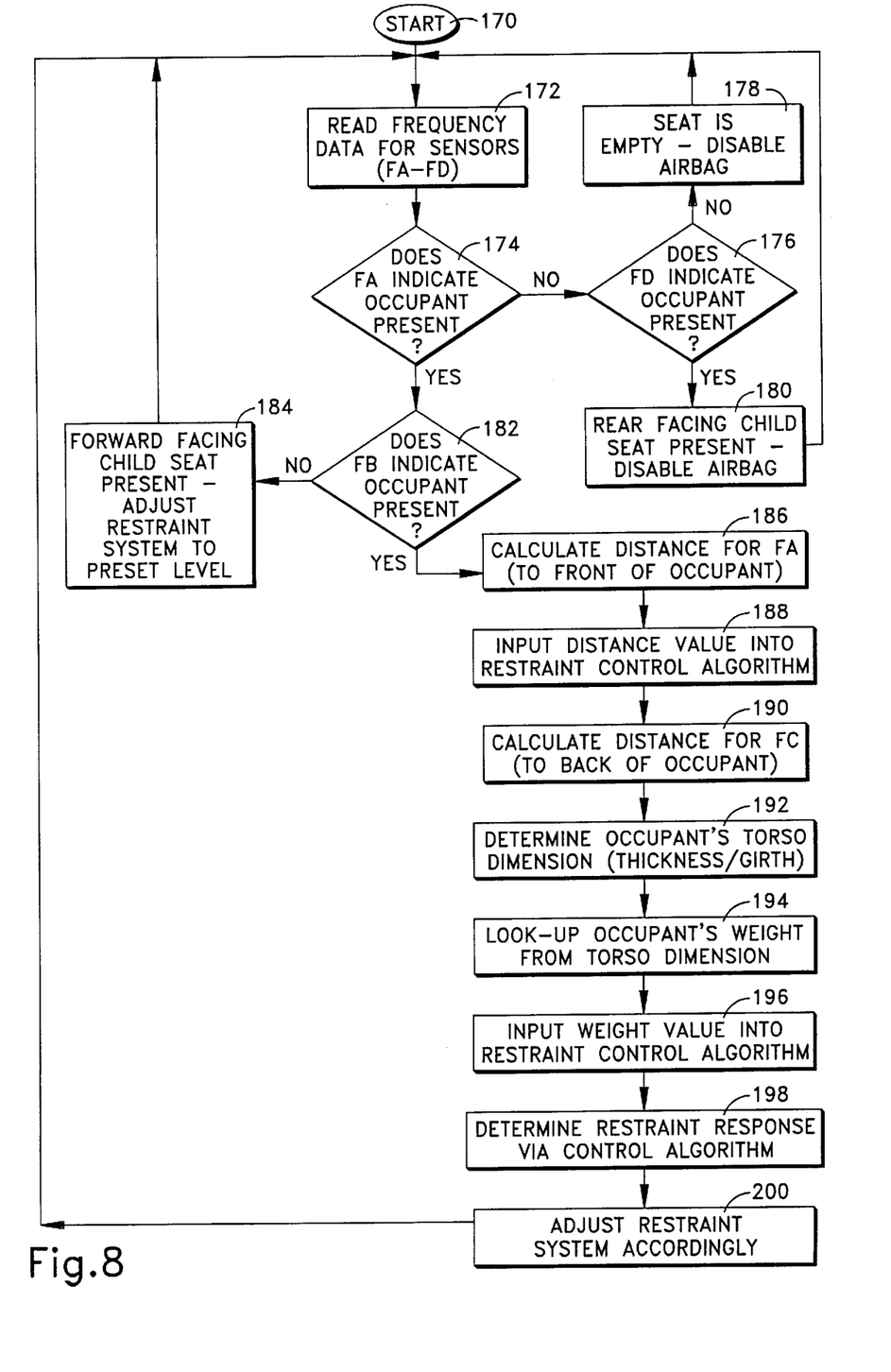

FIG. 8 illustrates an example process, in accordance with the present invention, performed within the controller 27 for control and adjustment of the restraint module 18. The process is initiated at step 170 wherein initial operational states are set. At step 172, the determined (FIG. 7) frequency data (FA–FD) associated with the four capacitive sensors 46A–46D is read from temporary memory storage. At step 174, it is determined whether the frequency data FA (i.e., from the first capacitive sensor 46A located within the instrument panel 22) is indicative of an occupant being present. Specifically, it is determined whether the frequency FA is below the associated predetermined threshold.

If the determination in step 174 is negative (i.e., the first capacitive sensor 46A does not detect the presence of an occupant), the process proceeds to step 176. In step 176, it is determined whether the frequency FD indicates that an occupant is present. If the determination in step 176 is negative (i.e., the fourth capacitive sensor 46D did not detect the presence of an occupant), the process proceeds to step 178. At step 178, the air bag is disabled because the seat is empty. It is unnecessary and wasteful to deploy an air bag when an occupant is not present in the seat. After step 178, the process loops back to step 172.

If the determination at step 176 is affirmative (i.e., the fourth capacitive sensor 46D detects the presence of an occupant, via the frequency being below its associated predetermined threshold), the process proceeds to step 180. Step 180 is reached because the first capacitive sensor 46A did not detect the presence of an occupant, but the fourth capacitive sensor 46D did detect the presence of an occupant. Such a scenario is indicative of an infant 14I (FIG. 5) in a RFIS 86 on the seat 16. Accordingly, at step 180, the restraint module 18 is disabled. After step 180, the process loops back to step 172.

If the determination within step 174 is affirmative (i.e., the first capacitive sensor 46A detects the presence of an occupant via the frequency FA being below its associated occupant present threshold), the process proceeds to step 182. At step 182, it is determined whether the second capacitive sensor 46B (i.e., the sensor located toward the top of the seat back of the seat 16) has detected the presence of an occupant (i.e., is the frequency FB below its associated occupant present threshold).

If the determination at step 182 is negative (i.e., the second capacitive sensor 46B does not detect the presence of an occupant), the process proceeds to step 184. Step 184 is reached because the first capacitive sensor 46A has detected the presence of an occupant, but the second capacitive sensor 46B has not detected the presence of an occupant. Such a situation is indicative of a small child 14C (FIG. 4) seated on a forward facing child booster seat 84. At step 184 (FIG. 8), the adjustable aspect(s) 26 of restraint module 18 is/are adjusted such that, if the air bag is deployed, the deployment level of the air bag is at a desired, adjusted preset level. Upon completion of step 184, the process loops back to step 172.

If the determination at step 182 is affirmative (i.e., the second capacitive sensor 46B detects the presence of an occupant), the process proceeds to step 186. Step 186 is reached in the process because both the first capacitive sensor 46A and the second capacitive sensor 46B have detected the presence of an occupant. Such a situation is indicative of an adult occupant 14 (or 14H) seated on the seat 16.

At step 186, the distance between the first capacitive sensor 46A and the occupant 14 (or 14H) is calculated. At step 188, the calculated distance is input into a restraint control algorithm. At step 190, the distance between the occupant 14 (or 14H) and the third capacitive sensor 46C is determined. At step 192, the torso dimension of the occupant is determined using the calculated distances from step 186 and step 190. Specifically, the torso dimension of thickness is determined. The torso thickness is proportional to the occupant's girth. At step 194, the torso dimension is used to lookup (using a look-up table in memory 88) the occupant's weight. At step 196, the weight of the occupant is input into the restraint control algorithm. At step 198, a restraint response is determined via the control algorithm. At step 200, the adjustable aspect(s) 26 of the restraint module is adjusted. Should the air bag be deployed during a collision, it will be deployed in accordance with the adjusted aspect. Upon completion of step 200, the process loops back to step 172.

From the above description of the invention, those skilled in the art will perceive improvements, changes and modifications. For example, other logic algorithm types could be used, such a neural-type network, wherein the system is taught certain occupant types. Such improvements, changes and modifications within the skill of the art are intended to be covered by the appended claims.

Having described the invention, the following is claimed:

1. An apparatus for determining at least one of presence, type, and size value of a vehicle occupant located within a vehicle, said apparatus comprising:

first capacitive sensor means located on an instrument panel of the vehicle that is on a first side of an occupant seating location within the vehicle for sensing a first capacitance value and for providing a first signal indicative of the first capacitance value;

means for determining from the first signal whether the first capacitance value is indicative of an occupant located proximate to said first capacitive sensor means;

means for determining a first distance between said first sensor means and the proximately located occupant using the first signal;

second capacitive sensor means located on a second side of the occupant seating location for sensing a second capacitance value and for providing a second signal indicative of the second capacitance value;

means for determining from the second signal whether the second capacitance value is indicative of the occupant located proximate to said second capacitive sensor means; and means for determining a second distance between said second sensor means and the proximately located occupant using the second signal.

2. An apparatus as set forth in claim 1 including means for determining position of the occupant relative to the instrument panel of the vehicle and for determining position of the occupant relative to a seat back of a seat of the vehicle.

3. An apparatus as set forth in claim 1, wherein said second capacitive sensor means is located on a seat back of a seat of the vehicle, and the seat back is on the second side of the occupant seating location.

4. An apparatus as set forth in claim 1, wherein said second capacitive sensor means is located on a door of the vehicle, and the door is on the second side of the occupant seating location.

5. An apparatus as set forth in claim 1, wherein said first capacitive sensor means is located on an air bag module in the instrument panel of the vehicle, and the air bag module is on the first side of the occupant seating location.

6. An apparatus as set forth in claim 1 including means for determining from at least one of the first and second signals whether the occupant type is a child in a child seat based on at least one of the first and second capacitance values, and means for determining a size value of the occupant using the first and second determined distances.

7. An apparatus as set forth in claim 6, wherein said means for determining the size value includes means for determining occupant torso thickness.

8. An apparatus as set forth in claim 7 including means for determining occupant weight using the determined occupant torso thickness.

9. An apparatus as set forth in claim 7 including means for determining absence of an occupant.

10. An apparatus as set forth in claim 7 including third capacitive sensor means located on a side of the occupant seating location for sensing a third capacitance value and for providing a third signal indicative of the third capacitance value, and fourth capacitive sensor means located on a side of the occupant seating location for sensing a fourth capacitance value and for providing a fourth signal indicative of the fourth capacitance value, and wherein said means for determining whether the occupant type is a child in a child seat uses at least two of the first through fourth capacitance values.

11. An apparatus as set forth in claim 10, wherein said means for determining whether the occupant type is a child in a child seat includes means for determining whether the occupant type is an infant in a rearward facing child seat or means for determining whether the occupant type is a child in a forward facing child seat.

12. An apparatus as set forth in claim 6 including means for determining occupant weight using the determined size value, and/or means for providing information regarding occupant type and occupant weight for use within an occupant restraint system.

13. An apparatus as set forth in claim 1, wherein the first side of the occupant seating location is adjacent to an instrument panel of the vehicle, the second side of the occupant seating location is adjacent to a seat-back of a vehicle seat, said first capacitive sensor means is located in the instrument panel, and said second capacitive sensor means is located in the seat-back.

14. An apparatus for determining occupant characteristics of a vehicle occupant, said apparatus comprising:
first capacitive sensor means located on a first side of an occupant seating location for sensing a first capacitance value resulting from the occupant and for providing a first signal indicative of the first capacitance value;
means for determining a first distance between said first sensor means and the occupant using the first signal;
second capacitive sensor means located on a second side of the occupant seating location for sensing a second capacitance value resulting from the occupant and for providing a second signal indicative of the second capacitance value;
means for determining a second distance between said second sensor means and the occupant using the second signal; and
means for determining characteristic values of the occupant using the first and second determined distances, said characteristic values including type, size and weight of the occupant.

15. An apparatus as set forth in claim 14, wherein said means for determining characteristic values of the occupant includes means for determining whether the occupant type is a child in a child seat.

16. An apparatus as set forth in claim 15, wherein said means for determining whether the occupant type is a child in a child seat includes means for determining whether the occupant type is an infant in a rearward facing child seat or means for determining whether the occupant type is a child in a forward facing child seat.

17. An apparatus as set forth in claim 14, wherein said means for determining characteristic values of the occupant includes means for determining a torso thickness of the occupant or means for determining the weight of the occupant using the determined torso thickness.

18. An apparatus as set forth in claim 14 including a plurality of additional capacitive sensor means located about the occupant seating location for sensing capacitance values and for providing signals indicative of said capacitance values, and wherein said means for determining characteristic values uses information contained within the signals provided by said plurality of additional capacitive sensor means.

19. An apparatus for determining an occupant type of a vehicle occupant, said apparatus comprising:
first capacitive sensor means located on a first side of an occupant seating position for sensing a first capacitance value in a space adjacent to said first sensor means and for providing a first signal indicative of the first capacitance value;
second capacitive sensor means located on a second side of the occupant seating position for sensing a second capacitance value in a space adjacent to said second sensor means and for providing a second signal indicative of the second capacitance value; and
means for determining whether the occupant is a child in a child seat using the first and second signals.

20. An apparatus as set forth in claim 19, wherein said means for determining whether the occupant is a child in a child seat includes means for determining whether the occupant is a child in a rearward facing child seat.

21. An apparatus as set forth in claim 19, wherein said means for determining whether the occupant is a child in a child seat includes means for determining whether the occupant is a child in a forward facing child seat or booster seat.

22. An apparatus as set forth in claim 19 including means for determining the occupant's size characteristic, means for determining a first distance between the first sensor means and the occupant using the first signal, means for determining a second distance between the second sensor means and the occupant using the second signal, and means for determining a size value of the occupant using the first and second determined distances.

23. An apparatus as set forth in claim 22, wherein the determined size value is occupant torso thickness.

24. An apparatus as set forth in claim 23 including means for determining occupant weight using the determined occupant torso thickness.

25. A method for determining at least one of presence, type, and size value of a vehicle occupant located within a vehicle, said method comprising:
sensing a first capacitance value with a first capacitive sensor means located on a first side of an occupant seating location within the vehicle;
providing a first signal indicative of the first capacitance value;
determining from the first signal whether the first capacitance value is indicative of an occupant located proximate to the first capacitive sensor;
determining a first distance between the first sensor means and the proximately located occupant using the first signal;

sensing a second capacitance value with a second capacitive sensor means located on a second side of the occupant seating location;

providing a second signal indicative of the second capacitance value;

determining from the second signal whether the second capacitance value is indicative of the occupant located proximate to the second capacitive sensor;

determining a second distance between the second sensor means and the proximately located occupant using the second signal;

determining from at least one of the first and second signals whether the occupant type is a child in a child seat based on at least one of the first and second capacitance values; and determining a size value of the occupant using the first and second determined distances.

26. A method for determining occupant characteristics of a vehicle occupant, said method comprising:

sensing a first capacitance value resulting from the occupant with a first capacitive sensor means located on a first side of an occupant seating location;

providing a first signal indicative of the first capacitance value;

determining a first distance between the first sensor means and the occupant using the first signal;

sensing a second capacitance value resulting from the occupant with a second capacitive sensor means located on a second side of the occupant seating location;

providing a second signal indicative of the second capacitance value;

determining a second distance between the second sensor means and the occupant using the second signal; and determining characteristic values of the occupant using the first and second determined distances, the characteristic values including type, size and weight of the occupant.

27. A method for determining an occupant type of a vehicle occupant, said method comprising:

sensing a first capacitance value in a space adjacent to a first sensor means located on a first side of an occupant seating location;

providing a first signal indicative of the first capacitance value;

sensing a second capacitance value in a space adjacent to a second sensor means located on a second side of the occupant seating location;

providing a second signal indicative of the second capacitance value; and determining whether the occupant is a child in a child seat using the first and second signals.

28. An apparatus for determining at least one of presence, type, and size value of a vehicle occupant located within a vehicle, said apparatus comprising:

first capacitive sensor means for sensing a first capacitance value and for providing a first signal indicative of the first capacitance value, said first capacitive sensor being located on an instrument panel of the vehicle that is on a first side of an occupant seating location within the vehicle;

means for determining whether the first capacitance value is indicative of an occupant located proximate to said first capacitive sensor means using the first capacitance value provide by the first signal;

means for determining a first distance between said first sensor means and the proximately located occupant using the first capacitance value provided by the first signal;

second capacitive sensor means for sensing a second capacitance value and for providing a second signal indicative of the second capacitance value, said second capacitive sensor means being located on a second side of the occupant seating location;

means for determining whether the second capacitance value is indicative of the occupant located proximate to said second capacitive sensor means using the second capacitance value provided by the second signal; and means for determining a second distance between said second sensor means and the proximately located occupant using the second capacitance value provided by the second signal.

* * * * *